UNITED STATES PATENT OFFICE.

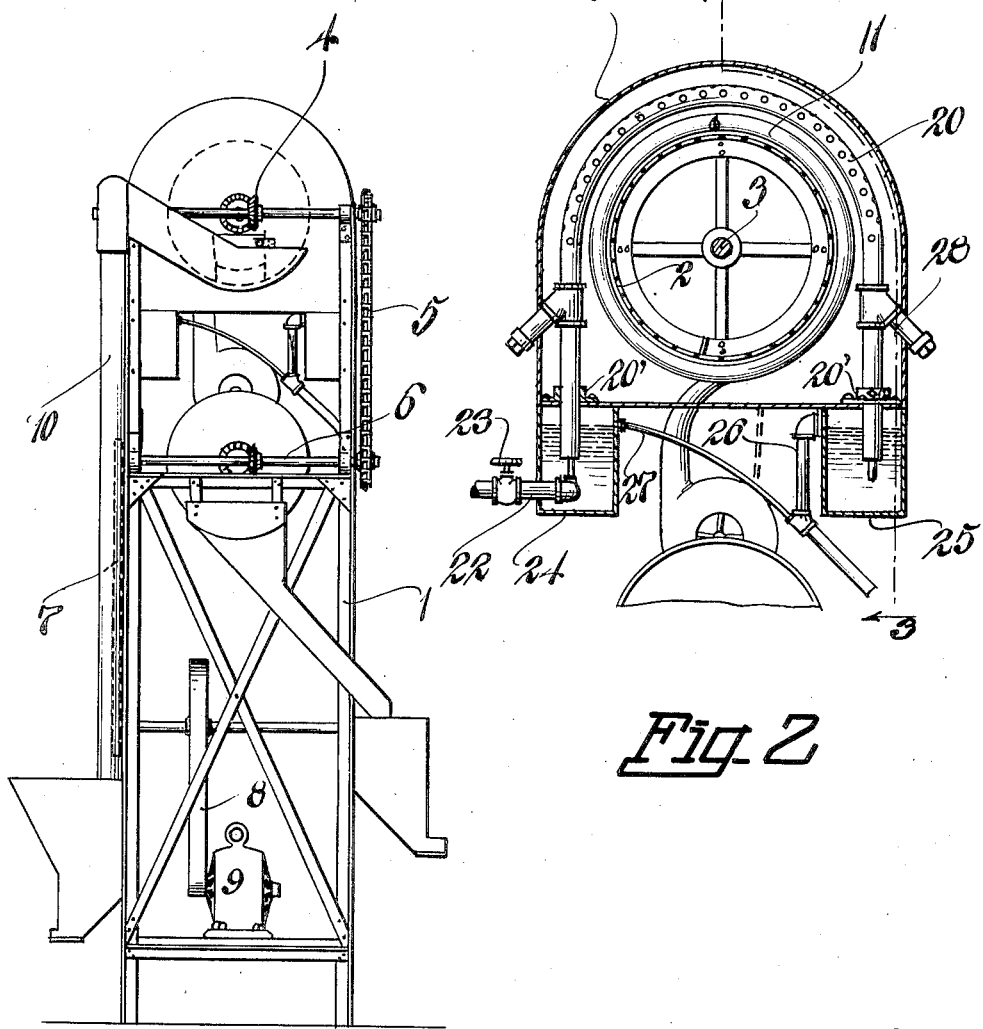

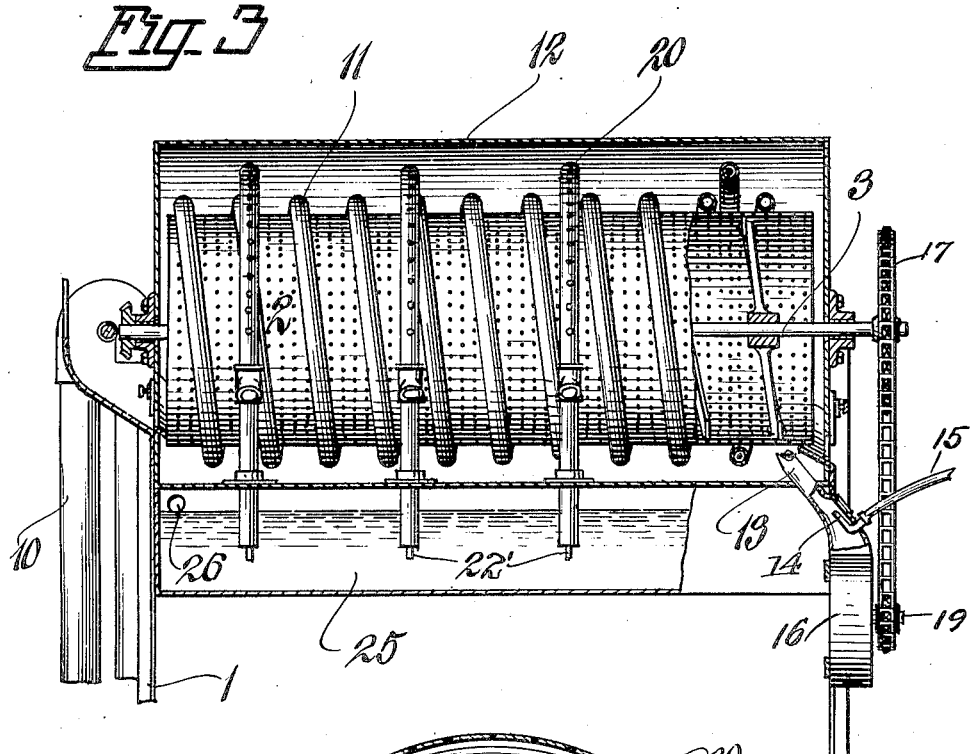
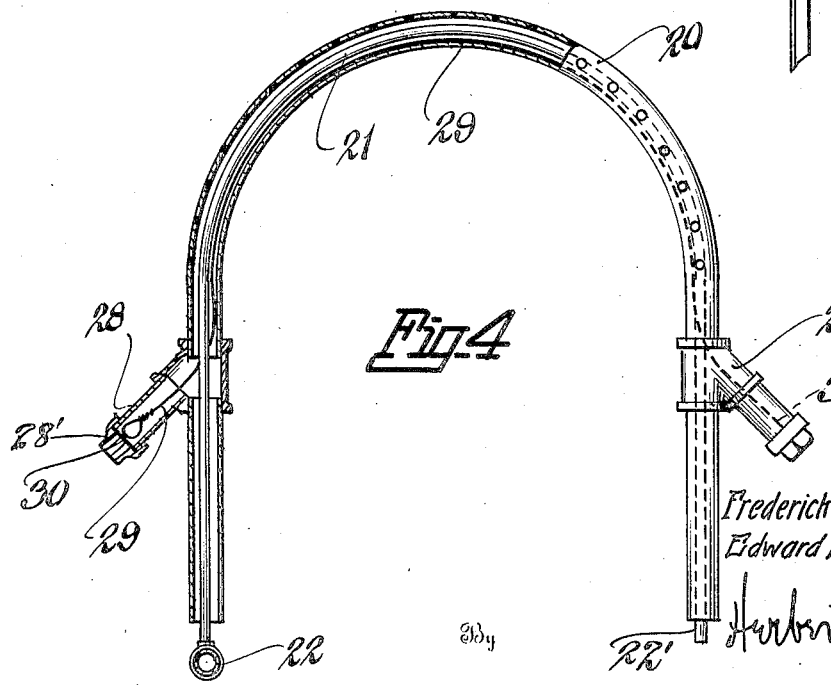

FREDERICK A. WILCOX AND EDWARD L. McGRORY, OF CHICAGO, ILLINOIS.

COFFEE-ROASTING MACHINE.

1,377,536.    Specification of Letters Patent.    Patented May 10, 1921.

Application filed February 16, 1920. Serial No. 359,056.

*To all whom it may concern:*

Be it known that we, FREDERICK A. WILCOX and EDWARD L. McGRORY, citizens of the United States, residing at Chicago, in the county of Cook and State of Illinois, have invented certain new and useful Improvements in Coffee-Roasting Machines, of which the following is a specification.

Our present invention relates to improvements in coffee roasting machines and is designed particularly for the purpose of providing a machine of this character wherein the aromatic odors arising from the coffee beans during the roasting process are retained by the coffee in order to preserve the full strength of the beverage for the consumer, and to this end the invention consists essentially in utilizing, in connection with the roasting machine, liquid or water seals for retaining and returning the fumes or odors to the coffee, while at the same time providing for the disposal of the moisture arising from the heated or roasted coffee.

These results are achieved by combining with the roasting apparatus an air tight inclosure having therein condensation apparatus for receiving and disposing of the water of condensation arising as moisture from the coffee, in connection with liquid or water seals which allow for the disposition of the moisture but prevent escape of the odors. The invention further consists in certain novel combinations and arrangements of parts forming a structure for accomplishing the above purposes as will be hereinafter more fully described and claimed.

In the accompanying drawings we have illustrated one complete example of the physical embodiment of our invention in which the parts are combined and arranged according to the best mode we have thus far devised for the practical application of the principles of our invention, and it will be understood that we contemplate colorable changes and alterations in the exemplified structure within the scope of our claims without departing from the spirit of our invention.

Figure 1 is a side elevation of a coffee roasting apparatus embodying our invention, showing the complete machine.

Fig. 2 is an enlarged, transverse vertical section through the roasting cylinder, air tight tank and water seals and showing also other connections of the apparatus.

Fig. 3 is a longitudinal, vertical sectional view of the part of the machine forming our invention taken at line 3—3 of Fig. 2.

Fig. 4 is a detail view, partly broken away for convenience of illustration showing one of the cold water pipes and condensing tube used in connection with the roasting cylinder of the machine.

In the preferred form or exemplification of our invention we have utilized the rotary drum or cylinder type of roasting apparatus with which is combined the usual auxiliary apparatus completing the structure of Fig. 1 in which the main frame 1 is of metal and forms the upright supporting structure for the revolving cylinder or perforated drum 2 of usual type secured, as by a spider frame, to the cylinder shaft 3 which extends longitudinally of the upper part of the frame and is journaled therein as usual. At the left end in Fig. 2 a bevel gear drive 4 is indicated for revolving the foraminous drum, and in Fig. 1, its driving connections are shown to be the sprocket chain 5, a second bevel gear shaft 6, the sprocket chain 7 and the driving belt 8 from the motor 9 supported on the main frame. Through these elements and their connections the roasting cylinder or foraminous drum 2 is revolved with the contained coffee beans in usual manner, and the beans may be furnished or supplied to the roasting cylinder by way of the elevator 10 and introduced to the interior of the drum through an open end thereof, and disposed of through the opposite end in usual or acceptable manner.

The coffee beans inclosed in the cylinder are heated while the latter is revolving by means of a helical coil 11 inclosed in the air tight casing 12, the latter conforming to the circular outline of the cylinder and spaced away from the cylinder as shown in Fig. 2. The heating coil or spirally arranged pipe 11 surrounding the cylinder has an inlet 13, as best seen in Fig. 3, together with an oil burner 14 at the end of the oil supply pipe 15 through which crude oil is supplied to the burner for fuel. The heated gases of combustion are forced through the coil surrounding the cylinder by means of the fan blower 16, which may be conveniently driven from the cylinder shaft through the instrumentality of the driving sprocket 17 on said shaft, the sprocket chain 18, and the driven sprocket wheel 19 on the blower or fan shaft. The action of the heating device will be apparent, as the heated gases are forced through the inlet pipe 13, which is passed through the air tight tank or casing 12, and the gases thence pass through the coil around the cylinder uniformly heating the foraminous drum and roasting the coffee beans therein, and the spent gases are disposed of in suitable manner.

The heating of the coffee beans results in comparative dehydration thereof and the moisture and aromatic odors arising from the heated beans, pass through the foraminous drum or perforated cylinder into the air tight casing 12, and from this casing the moisture is disposed of in the form of water of condensation, while the odors or fumes of the coffee are prevented from escaping and are retained therein to be returned to and absorbed by the coffee beans.

For this purpose, we locate between the interior walls of the casing and the heating coil, a series of arched tubular members or condenser tubes 20, spaced at regular intervals along the cylinder and surrounding it and its heating coil, and fixed at 20' to the horizontal bottom of the casing 12, through which member they project.

Within each of the condenser tubes is located a cold water circulation pipe 21, conforming to the tube, but of less diameter than these tubular members in order to form an adequate space therein. The portions of the tubes inclosed within the casing are perforated for the admission of moisture arising from the heated coffee beans, and the purpose of the cold water circulation pipes is to condense this moisture within the tubes, said pipes receiving their cold water supply from the main pipe 22 and the supply is regulated by the valve 23, as in Fig. 2.

At the sides of the frame and beneath the roasting cylinder are located two water tanks 24 and 25 into which the respective ends of the arched tubular condensing members 20 project, their ends being open and immersed below the level of the water contained in the tanks, and of course the water level is maintained at all times above these open lower ends of the arched tubes.

The ends of the water circulation pipes project through the open ends of the arch tubes, one end of each of these pipes being connected to the supply pipe 22 and the other end, as 22', is open to the interior of the water seal tank 25, as in Fig. 2, below the water level in the tank 25. A main outlet pipe 26 leads from the upper portion of the tank 25, and a branch outlet pipe 27 connects the tank 24 with the main outlet pipe 26 as in Fig. 2 to complete a continuous circulation of water through the pipes and tanks.

For the purpose of cleaning the interior of the condensation tubes 20 we utilize a short connecting pipe or fitting 28 at the outer side of each leg of the arched tube, and a wire 29 which passes around through the tube, has its ends 30 in accessible position in these fittings 28 that are closed by end plugs 28', and when the plugs are removed, a brush may be attached to the wire 29 and the wire and brush pulled through the tube for cleaning it and the exterior of the water pipes 21 within the tube.

It will be apparent that the arched tubes with their open ends immersed in the tanks 25 and 24 are sealed by the contained water, and fumes or odors arising from the roasting coffee are retained, and prevented from escaping from the casing or tubes by the water seal, while on the other hand the continuous circulation of cold water through the pipes in the interior of the arched tubes, condenses the moisture in these fumes within the perforated arched tubes, and the water of condensation falls or flows to the water in the tanks 24 and 25, through the open lower ends of the legs of the arched tubes. In this manner the fumes are retained in the air tight casing to again enter the roasting coffee beans, and the moisture is disposed of to best advantage.

What we claim and desire to secure by Letters Patent is—

1. The combination with the roasting cylinder and its inclosing casing, of heating means, and a condensing apparatus within the casing for disposing of moisture arising from the contents of the roasting cylinder having means for sealing the casing against escape of odors from the casing.

2. The combination with the roasting device, the heating device, and the inclosing air tight casing, of a condensing tube having its open ends sealed outside the casing and provided with an apertured portion within the casing, and means within the tube for causing condensation of moisture therein from steam arising in the roasting device.

3. The combination with the roasting device, the heating device and the inclosing air tight casing, of an arched condensing tube having its open ends in water seals and an apertured portion in the casing and a cold water circulation pipe within said condensing tube for the purpose described.

4. The combination with the air tight casing and spaced water seal tanks, of a series of arched apertured tubes in the casing with their open ends in said tanks, and a cold water circulation pipe in each tube for the purpose described.

5. The combination with the air tight casing and spaced water seal tanks, of a series of arched apertured tubes in the casing having their open ends in said tanks, a series of water pipes in said tubes forming with said tanks a circulation system, a roasting device within the casing, and a heating device therefor as described.

6. The combination with the revoluble, perforated, roasting cylinder and the heat coil surrounding the same, of an air tight casing inclosing the coil and cylinder, a pair of spaced water seal tanks beneath the casing, a series of spaced arched condensation tubes having apertured portions in the casing and their open ends in the water seal tanks, a water pipe in each tube forming with the tanks a circulation system, and means for forcing heated gases through the coil.

7. The combination with the revoluble, perforated roasting cylinder, the surrounding heating coil, and the air tight casing inclosing said cylinder and coil, of a series of arched tubes each having a perforated portion in the casing around the coil and the open ends of said tubes projecting through the casing bottom, a pair of spaced water seal tanks in which said open ends are immersed, a series of water pipes in said tubes opening into one tank and having a supply pipe connected to their ends in the other tank and forming with said tanks a circulation system, and means for forcing heated gases through said coil.

In testimony whereof we affix our signatures.

FREDERICK A. WILCOX.
EDWARD L. McGRORY.